3,378,615
PROCESS FOR THE MANUFACTURE OF LOW-POROSITY BURNT MAGNESIA
Tuvia Zisner, Ra'anana, Israel, assignor to Mifalei Yam Hamelah, B.M., Beersheba, Israel, a company of Israel
No Drawing. Filed Apr. 5, 1965, Ser. No. 445,713
Claims priority, application Israel, Apr. 15, 1964, 21,180
4 Claims. (Cl. 264—66)

ABSTRACT OF THE DISCLOSURE

A process for the manufacture of highly pure dead-burnt magnesia of low porosity and a high bulk specific gravity approaching that of crystalline periclase by forming a dried compacted paste of magnesium hydroxide and firing the compacts in three distinct stages, a first one up to about 500° C., during which the rate of temperature rise does not exceed 20° C. per minute; a second stage between about 500° and about 1000° C., during which the compacts are moved as little as possible relative to one another for avoiding dusting and crumbling, and a third stage in which the compacts are sintered.

---

This invention relates to the manufacture of low-porosity dead-burnt magnesia, particularly for use as a starting material for the manufacture of ceramic refractories especially in the form of grog. More particularly the invention is concerned with processes in which the magnesia is prepared by the firing of magnesium hydroxide. For the purposes of the present invention, magnesium hydroxide of any origin may be used, for example, that precipitated from magnesium salt solutions with alkali hydroxide or ammonia, or from carnallite brines with calcined dolomite; or magnesium hydroxide formed by the hydration of "active," i.e., hydratable magnesium oxide, e.g., the product resulting from the thermal decomposition of magnesium salts such as chloride or sulfate.

A conventional process for producing dead-burnt low-porosity magnesia from magnesium hydroxide consists in feeding a cake or paste of magnesium hydroxide with a free-water content (as distinct from the water of hydration) of about 50% by weight to one end of a rotary kiln through which it proceeds in counter-current to a flow of combustion gases. This process produces a small-grained mass of magnesia and has the main drawback of excessive dust formation.

By another known process an aqueous magnesium hydroxide cake or paste is deprived of some of its free-water contents by partial drying which is followed by a "working" operation, i.e., folding, mixing and kneading, intended to increase the plasticity of the magnesium hydroxide and to raise the magnesia contents of the product to 40–49% calculated as MgO (corresponding to 58–71% of $Mg(OH)_2$), and this product is then dead-burnt. This known process is unsatisfactory for, among others, the following reasons: unless the free-water content of the starting material is controlled, prior to the "working" operation, within a well-defined range, the subsequent firing operation produces a large amount of dust; and the machine in which the "working" operation is performed has to be so large as to allow the material being "worked" to dwell therein for at least 10 minutes with a view to avoiding excessive disintegration, in the course of the subsequent firing process, of the agglomerates formed by the "working" step.

Another known process first converts the hydroxide into magnesia of small particle size by calcination at a temperature of 600–1100° C., then the latter is pelleted under pressures of 1000 kg./cm.$^2$ or more, and the pellets are sintered at temperatures above 1600° C. Among the drawbacks of this known process there are to be mentioned: excessive dust formation during the first calcination step; high wear of the pelleting machine owing to the abrasive nature of the magnesia; the fragility of the magnesia pellets which necessitates special care and handling equipment during the sintering process; and the necessity of providing two firing operations.

The invention has the object to provide a process by which magnesium hydroxide can be converted into low-porosity magnesia in a simple manner and without excessive dust-formation and wear and tear of the machinery.

In the process according to the invention, a magnesium hydroxide paste is dried at so low a temperature that no appreciable decomposition of the hydroxide takes place; the dried hydroxide is shaped under pressure into compacted bodies (hereinafter "compacts" for short), and the latter are fired to sintering.

The preferred range of free-water contents to which the magnesium hydroxide cake is reduced by the drying operation is of the order of 0 to 23% by weight of the cake.

The compacting of the magnesium hydroxide may be done either by pelleting under high pressure or by extrusion under pressure.

The pelleting pressure should be at least 500 kg./cm.$^2$ and may preferably even exceed 2000 kg./cm.$^2$. The pellets may have any desired shape, preferably cylindrical or spherical or a shape close to these, and their maximum dimension should preferably not exceed about 5 cm.

Extruding may be preferable to pelleting in some cases when the formation of continuously profiled sections is desired, e.g., in the manufacture of building elements which are fired and brought into their final shape without intermediate breaking-up of the fired magnesia into grog. In such a case it is desirable to reduce the normally very considerable shrinkage (of the order of 70% of the initial volume of the compact). Such reduction can be achieved by the admixture of magnesium oxide, either active or dead-burnt, as an extender. A proportion of up to 40% of MgO by weight of the mixture of MgO and $Mg(OH)_2$ can be tolerated with the process according to the invention. The extrusion is preferably facilitated by the use of lubricants, known per se, which may be admixed to the magnesium hydroxide paste or cake, or to the mixture of the magnesium hydroxide and magnesium oxide, before or after the drying operation. Suitable lubricants are, for example, bees wax, sulfite waste liquor, gums such as tragacanth or gum arabic, if desired, in aqueous dispersion, and cutting oils.

The firing by which the compacts of magnesium hydroxide are converted into low-porosity magnesia, may be carried out in one single operation, or in two or more successive stages immediately following upon one another without intervening cooling of the material being fired. Firing in two or more steps is advisable in those cases where the firing stages are performed in several furnaces designed to meet the special requirements of the firing operation in the various temperature ranges, for example: a slowly rotating and slowly heating rotary kiln for heating the compacts to about 500° C., a furnace in which the compacts are prevented as far as possible from moving relative to one another in the range from about 500 to about 1000° C., and a faster rotating rotary furnace for the sintering stage.

In any case the following working conditions should be observed:

(a) The magnesium hydroxide compacts are subject to breaking up as long as substantial amounts of water are evaporated within their mass. Therefore, the first stage of the firing process, up to about 500° C., should proceed at such a heating rate that the evaporation of the water does not destroy the structure of the compacts, for which the temperature should be raised by not more than 20° C. per minute. At about 500° C. the danger of break-up because of steam formation can be considered to have passed. The optimal heating rate depends to some extent on the size of the compacts, and it should be the smaller, the larger the compacts.

(b) In the range between about 500 and about 1000° C. the compacts have a high porosity, of the order of 70% of their volume, and are for this reason very fragile as compared with the unfired magnesium hydroxide compacts. While the firing process passes through this temperature range the compacts should, therefore, be subjected to minimum as of friction and vibration in order to minimize breaking up and dust formation in the furnace. This can be done by the selection of a suitable known type of furnace in which the compacts are moved as little as possible. On the other hand, since the rate of heating is no longer critical in this temperature range, the temperature may be raised quickly.

Above 1000° C. the compacts possess sufficient mechanical strength and plasticity to withstand any reasonable degree of friction or vibration.

The danger of break-up and of dust-formation in the heating stage within the temperature range between about 500 and 1000° C. can be decreased by the addition of a suitable binder to the magnesium hydroxide before the compacting operation. Suitable binders are, for example, water-soluble magnesium salts such as the chloride or sulfate, which form a cement with the magnesium hydroxide or magnesia and, on being fired, decompose into the oxide and a volatile component which evaporates. Other suitable binders are, for example, thermally stable salts such as alkali metal halides which fuse and thereafter evaporate in the firing process without leaving contaminating traces. After the addition of a cement-forming binder it is advisable to keep the mixture for some time at a moderate "curing" temperature, e.g. of the order of 30 to 100° C. in a humid atmosphere, prior to or at the beginning of the firing process, in order to allow the cement to be formed.

The firing operation for sintering the magnesia is performed at conventional temperatures of, for example, up to 1600° C. or even higher.

The process according to the invention has been found to produce sintered low-porosity bodies of magnesia having a bulk specific gravity (BSG) of 3.27 to 3.53, being 91.4 to 98.5% of the "theoretical" specific gravity (3.58) which is that of pure crystalline periclase. The degree of purity of the magnesia depends on that of the magnesium hydroxide used as a starting material, it being understood that some impurities contained in the latter as well as those added as binder are eliminated by evaporation in the firing process.

The process according to the invention provides a number of advantages as compared with the known processes referred to above. Thus, for example:

The magnesium hydroxide compacts are as a rule harder, less fragile and more durable than pre-calcined magnesia pellets and their handling prior to the firing operation is easier and requires less care. The magnesium hydroxide is virtually non-abrasive while magnesia powder has a considerable abrasive action of the pelleting dies; the latter, therefore, have a considerably longer life in the process according to the invention than in the process in which magnesia is pelleted. Only one firing operation is required, and this entails but little break-up and dust formation if the necessary precautions, outlined above, are observed.

The invention is illustrated by the following examples to which it is not limited:

EXAMPLE 1

A magnesium hydroxide precipitate was produced from a magnesium chloride (120 g./l.)—calcium chloride (25 g./l.) brine by the addition of calcined dolomite. The precipitate was thickened by settling, the supernatant brine removed and the precipitate re-pulped with water until the chloride-ion contents had dropped to below 10 g./l., then the thickened magnesium hydroxide precipitate was filtered off. The pasty filter cake, which contained about 45% by weight of free water, was dried at 120° C. whereby a fine powder of a $Mg(OH)_2$ content of 98.0% was obtained.

The powder was pressed under a pressure of 3500–4000 kg./cm.$^2$ into button-shaped pellets of about 12 mm. diameter and 10 mm. height.

The pellets were fired in a tunnel oven through which they were moved so as to undergo a minimum of friction and of movement in relation to one another. They were first heated up to 500±10° C. in the course of 30 minutes and then to 1800±50° C. at which temperature they were kept for one hour.

The product was a low-porosity magnesia of bulk specific gravity 3.35, i.e., 93.6% of the "theoretical" specific gravity of 3.58 of crystalline periclase.

The pellets had come virtually intact through the whole operation. They were then comminuted to form a grog for further processing into refractories by known ceramic methods.

EXAMPLE 2

Magnesium hydroxide was prepared by the quenching in water of hot magnesium oxide resulting from the thermal decomposition of magnesium chloride. The hydroxide had a degree of purity of 99.8%.

A paste of this hydroxide, containing about 33% by weight of free water, was homogenized by being passed through a set of 20 mesh sieves, and then extruded under a pressure of 2000 kg./cm.$^2$ by means of a piston extruder through a cylindrical orifice of 7 mm. diameter. The extruded bar was cut into sections of 6 cm. length which were dried at 120° C.

These sections were fired as described in Example 1. The bulk specific gravity of the fired product was 3.25, i.e., 90.8% of the "theoretical" specific gravity of crystalline periclase.

EXAMPLE 3

Magnesium hydroxide described in Example 1 was compacted under various pressures (stated below) to form pellets containing each about 2.5 g. of magnesium hydroxide (68% of MgO) and having a height of about 1 cm. at a diameter of about 12 mm.

Another portion of the same magnesium hydroxide was soaked with a saturated aqueous solution of magnesium sulfate and dried, first at 75° C., finally at 120° C. The dry powder contained 63.3% of MgO and 2.64% of $SO_4$. It was compacted into pellets similarly as was the first portion of magnesium hydroxide.

All the pellets were then fired at 950° C. for 1½ hours and then crushed in a standard hydraulic crushing-strength measuring machine. The pressure was applied in axial direction to the entirely flat upper face of the pellet and the crushing strength was calculated.

The results are tabulated in the table below:

TABLE

| Composition | Compacting pressure, kg./cm.$^2$ | Crushing strength, kg./cm.$^2$ |
|---|---|---|
| $Mg(OH)_2$ | 1,000 | 104 |
| | 3,320 | 217 |
| $Mg(OH)_2+MgSO_4$ | 1,000 | 580 |
| | 3,320 | 1,200 |

These results show that the addition of magnesium sulfate as a binder increases the crushing strength about five-fold or more.

I claim:
1. A process for the manufacture of compacts of low-porosity dead-burnt magnesia comprising:
   (a) drying a magnesium hydroxide paste to a moisture content of less than 23%;
   (b) forming said dried paste into shape compacts;
   (c) firing said compacts in the three following stages to render said hydroxide as low-porosity dead-burnt magnesia:
      (1) firing to a temperature of about 500° C. at a heating rate not exceeding a temperature rise of 20° C. per minute;
      (2) firing from a temperature of about 500° C. to about 1000° C., during which the compacts are in a substantially stationary condition relative to each other; and
      (3) firing to a sintering temperature.

2. A process according to claim 1, wherein the magnesium hydroxide paste is dried at an elevated temperature at which no chemical dehydration of the magnesium hydroxide takes place.

3. A process according to claim 1 comprising firing the compacts in rotary furnaces in the first and third firing stages, and in a tunnel oven in the second firing stage.

4. A process according to claim 1, wherein the magnesium hydroxide paste is constituted essentially of pure magnesium hydroxide.

References Cited

UNITED STATES PATENTS

| | | | |
|---|---|---|---|
| 2,447,412 | 8/1948 | Heuer | 23—201 X |
| 2,640,759 | 6/1953 | Hughey | 23—201 |
| 2,641,529 | 6/1953 | Austin | 23—201 |
| 2,641,531 | 6/1953 | Austin | 23—201 |
| 2,957,752 | 10/1960 | Gloss | 23—201 |

FOREIGN PATENTS 234,548  10/1959  Australia.

ROBERT F. WHITE, *Primary Examiner.*

J. A. FINLAYSON, J. R. HALL, *Assistant Examiners.*